(12) United States Patent
Kato et al.

(10) Patent No.: US 7,951,488 B2
(45) Date of Patent: May 31, 2011

(54) CATHODE AND BATTERY INCLUDING SAME

(75) Inventors: Yoshikazu Kato, Kanagawa (JP); Ryosuke Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/713,980

(22) Filed: Feb. 26, 2010

(65) Prior Publication Data

US 2010/0159322 A1 Jun. 24, 2010

Related U.S. Application Data

(62) Division of application No. 10/628,047, filed on Jul. 24, 2003, now Pat. No. 7,691,534.

(30) Foreign Application Priority Data

Jul. 24, 2002 (JP) ................................ P2002-215168

(51) Int. Cl.
*H01M 4/62* (2006.01)
*H01M 4/60* (2006.01)
*H01M 4/58* (2010.01)

(52) U.S. Cl. .................. 429/217; 429/212; 429/218.1; 429/231.9; 429/231.95

(58) Field of Classification Search .................. 429/217, 429/212, 218.1, 231.9, 231.95
See application file for complete search history.

(56) References Cited

U.S. PATENT DOCUMENTS

| 5,631,100 | A | 5/1997 | Yoshino et al. |
| 6,455,202 | B1 | 9/2002 | Marugan et al. |
| 6,632,566 | B1 | 10/2003 | Yamada et al. |

FOREIGN PATENT DOCUMENTS

JP 10-255760 * 9/1998

* cited by examiner

*Primary Examiner* — Helen O Conley
(74) *Attorney, Agent, or Firm* — K&L Gates LLP

(57) ABSTRACT

A cathode and a battery including the cathode are provided. The cathode includes a cathode mixture layer with a cathode active material and a binder. The binder can include, for example, a synthetic rubber latex and a thickener, polyvinylidene fluoride denaturalized by maleic acid and/or the like.

9 Claims, 2 Drawing Sheets

CATHODE AND BATTERY INCLUDING SAME

CROSS REFERENCES TO RELATED APPLICATIONS

The present application is a divisional of U.S. patent application Ser. No. 10/628,047, currently U.S. Pat. No. 7,691,534 filed on Jul. 24, 2003 which claims priority to Japanese Patent Application No. JP2002-215168 filed on Jul. 24, 2002, the entire contents of which are being incorporated herein by reference.

BACKGROUND

The present invention relates to cathodes and batteries including same. More specifically, the present invention relates to cathodes having a cathode mixture layer including a cathode active material and a binder, and batteries including the cathode.

Recently, in connection with the development of electronic engineering, many compact portable electronic devices, such as a combination camera (e.g., video tape recorder), a mobile phone, and a laptop computer are commonly known and used, and the size and weight of such devices are being reduced. Consequently, as a portable power source used to power save, a compact and lightweight battery with a high energy density, particularly, a secondary battery has been developed.

For example, a secondary battery having an anode active material capable of inserting and extracting lithium metals, lithium compounds, or lithium ions, has the high voltage and excellent reversibility. In particular, a lithium ion secondary battery, using a composite oxide of lithium and a transition metal as a cathode active material, and using a carbonaceous material as an anode active material, is lightweight and has a large discharge capacity, compared to conventional lead secondary batteries and nickel-cadmium secondary batteries. Thus, the lithium ion secondary battery is widely used for electronic devices, such as mobile phones, laptops and the like.

Currently, a primary example of typically used cathode active materials for the lithium ion secondary battery is $LiCoO_2$. There exist, however, a number of problems related to use of same, such as, in terms of load characteristics, charge and discharge cycle characteristics, and safety or the like. For example, in order to improve the load characteristics, it is necessary to smooth an electrode, further to make the electrode into a thin film. To obtain such electrode, it is necessary to downsize grain diameters of the materials making the electrode, and to improve conductivity. However, when downsizing the grain diameters, the specific surface area becomes large. Thus, unless more binder is added, the electrode becomes fragile, and sufficient peel strength cannot be obtained.

However, polyvinylidene fluoride (PVDF), which has been conventionally and primarily used as a binder, is a non-electrically conductive polymer. Therefore, there exists a problem such that increasing the amount of PVDF causes not only lowering of a ratio of an active material in the electrode and lowering of a charge and discharge capacity, but also hindrance of electron transfer, increase of internal resistance of the electrode, and significant deterioration of charge and discharge cycle life of the battery and capability of high load charge and discharge of the battery. Further, there exists another problem such that the electrode becomes hard and fragile, and electrode peeling and cracking occur.

A need therefore exists to provide improved batteries, including parts thereof, such as cathodes.

SUMMARY

The present invention provides a cathode, wherein a high-strength thin film electrode can be realized, its load characteristics are improved, its charge and discharge capacity and capacity maintenance ratio are high, and its charge and discharge cycle life are enhanced, and a battery including same.

A cathode according to an embodiment of the present invention includes a cathode mixture layer containing a cathode active material and a binder. The cathode mixture layer contains a synthetic rubber latex adhesive and a thickener as the binder. In the cathode mixture layer, the content of the synthetic rubber latex adhesive ranges from about 2 wt % to about 4 wt %, and the content of the thickener ranges from about 0.5 wt % to about 2.5 wt %.

A cathode according to an embodiment of the present invention comprises a cathode mixture layer containing a cathode active material and a binder. The cathode mixture layer contains polyvinylidene fluoride denaturalized by maleic acid as the binder, wherein the content of the polyvinylidene flouride in the cathode mixture layer ranges from about 0.5 wt % to about 4 wt %.

A battery according to an embodiment the present invention includes a cathode, an anode, and an electrolyte. The cathode includes a cathode mixture layer containing a cathode active material, and synthetic rubber latex adhesive and a thickener as the binder. In the cathode mixture layer, the content of the synthetic rubber latex adhesive ranges from about 2 wt % to about 4 wt %, the content of the thickener ranges from about 0.5 wt % to about 2.5 wt %, and a charge final voltage is about 4.0 V and under.

A battery according to an embodiment of the present invention includes a cathode, an anode and an electrolyte. The cathode includes a cathode active material and polyvinylidene fluoride denatured by maleic acid as the binder. In the cathode mixture layer, the content of polyvinylidene fluoride denatured by maleic acid ranges from about 0.5 wt % to about 4 wt %, and a charge final voltage is about 4.0 V and under.

In the cathode, according to an embodiment of the present invention, since the synthetic rubber latex adhesive and the thickener are included as a binder, high flexibility and smoothness can be obtained. Thus, electrode peeling and cracking are prevented. Further, the synthetic rubber latex adhesive and the thickener, or polyvinylidene fluoride denaturalized by maleic acid is contained as a binder according to an embodiment of the present invention. Thus, the content of the binder can be decreased, and the ratio and capacity of the active material can be increased. Further, electron transfer can be facilitated to decrease the resistance.

In a battery according to an embodiment of the present invention, a cathode according to an embodiment of the present invention is employed. Thus, the charge and discharge capacity is increased and the internal resistance is decreased. Further, the charge and discharge capacity and the charge and discharge cycle life are improved, and the load characteristics are improved.

Additional features and advantages are described herein, and will be apparent from the following Detailed Description and the figures.

DETAILED DESCRIPTION

The present invention generally relates to batteries and parts thereof. More specifically, the present invention relates to cathodes that have a cathode mixture layer that includes a cathode active material and a binder, and batteries including same.

Figure 1:
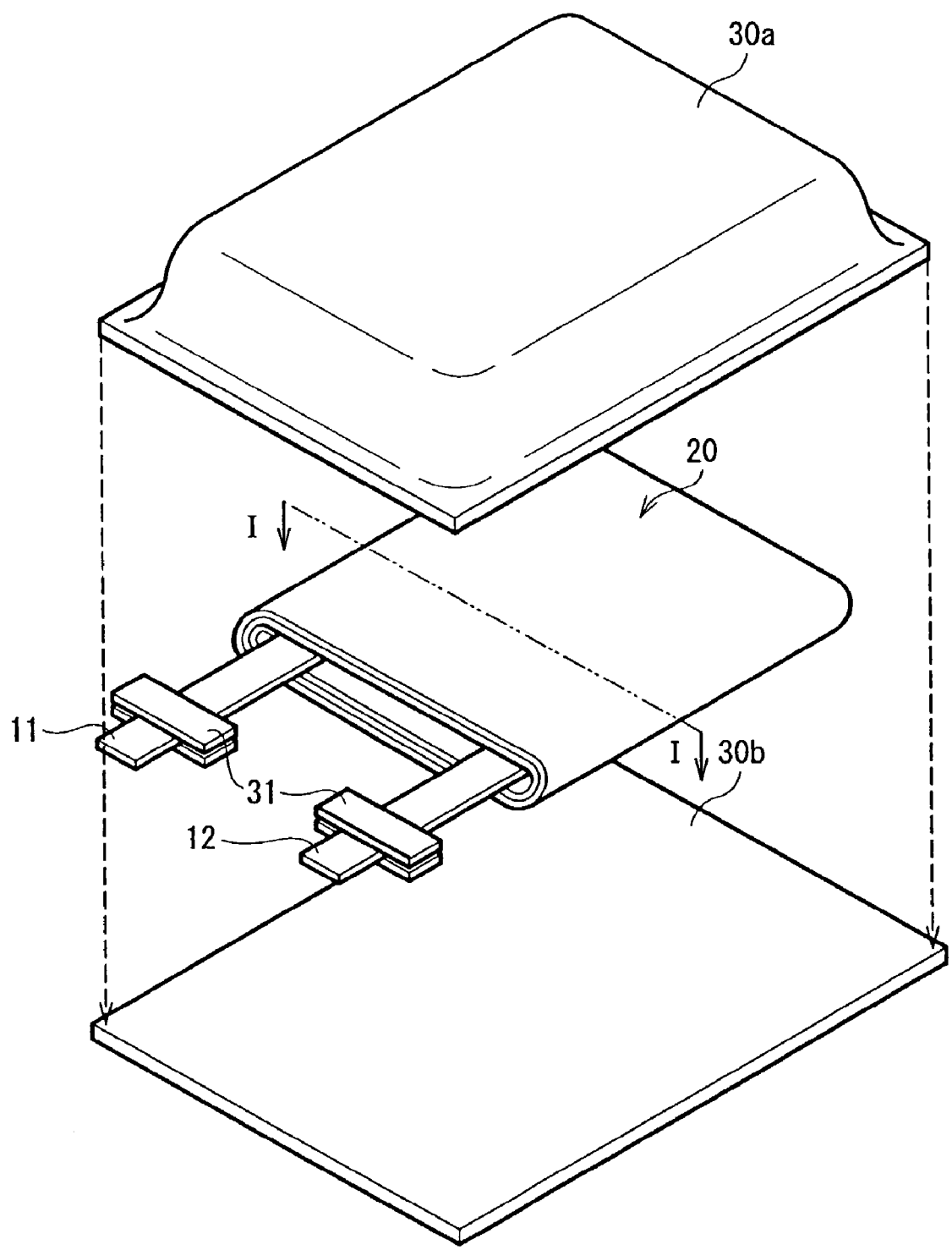
FIG. 1 is an exploded perspective view of a secondary battery according to an embodiment of the invention.
Figure 2:
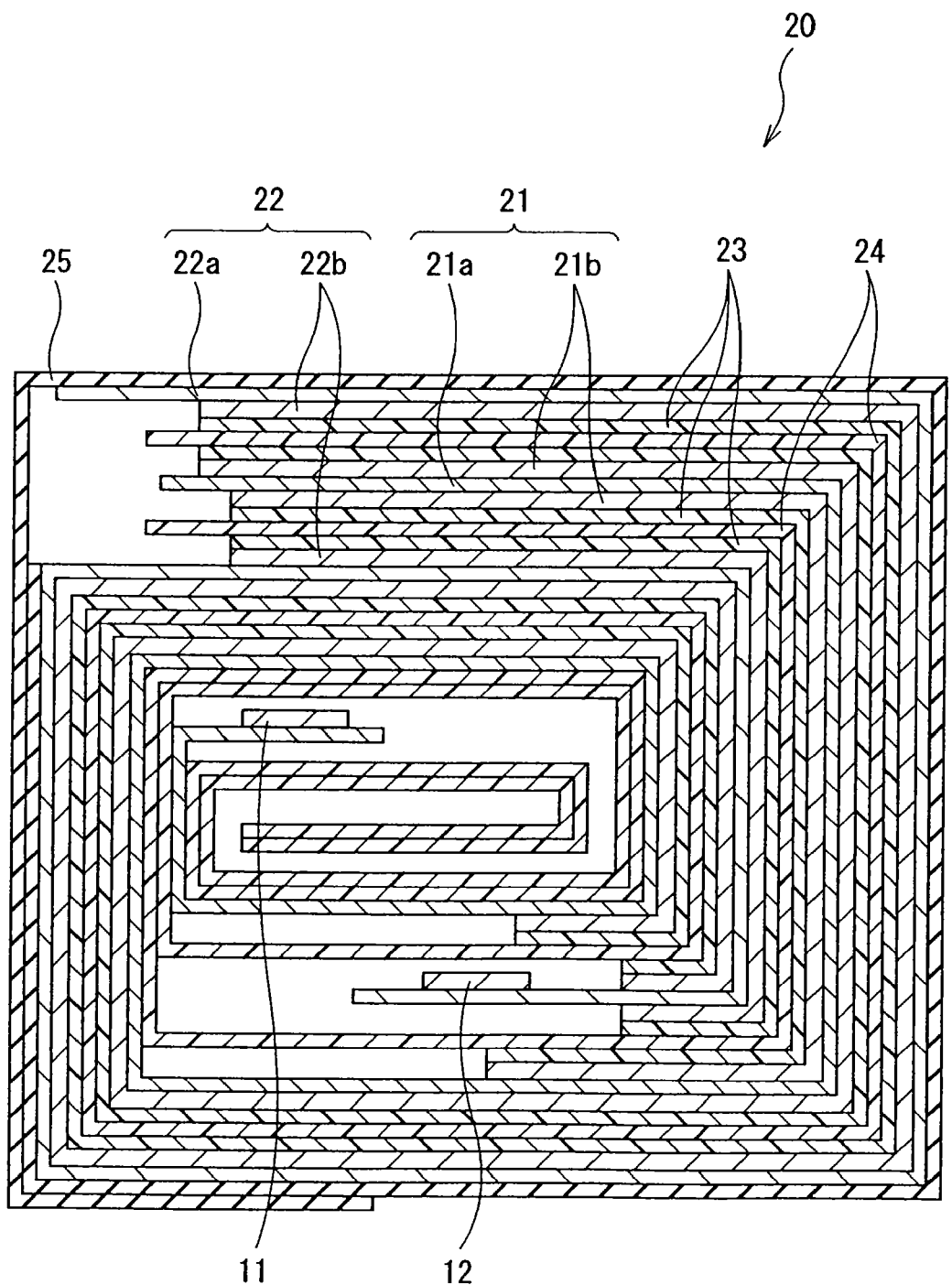
FIG. 2 is a cross sectional view taken along line I-I of a battery element illustrated in FIG. 1.

FIG. 1 shows an exploded view of a secondary battery according to an embodiment of the invention. FIG. 2 shows a cross sectional view taken along line I-I of a battery element 20 illustrated in FIG. 1. The present invention will be described below, without limitation, in greater detail with reference made to the figures where appropriate.

In a secondary battery according to an embodiment of the present invention, the battery element 20, wherein a cathode 21 and an anode 22 are layered and wound with an electrolyte layer 23 and a separator 24 in between, is crimped and enclosed in film exterior members 30a and 30b. The exterior members 30a and 30b are made of, for example, an aluminum laminated film wherein a polyolefin film, an aluminum foil, and a polyolefin film are applied together in this order. Outer edges of the exterior members 30a and 30b are contacted with each other. An end of a cathode lead wire 11 and an end of an anode lead wire 12 are projected from the exterior members 30a and 30b. Adhesive film 31 is inserted between the exterior members 30a and 30b and the cathode lead wire 11 and the anode lead wire 12, for example. The adhesive film 31 is used to secure the insulation, as well as to improve the adhesion properties between the cathode lead wire 11 and the anode lead wire 12 and the exterior members 30a and 30b.

In the battery element 20 according to an embodiment of the present invention, for example, the separator 24, the electrolyte layer 23, the cathode 21, the electrolyte layer 23, the separator 24, the electrolyte layer 23, the anode 22, and the electrolyte layer 23 are sequentially layered and wound. At the outermost circumferential part, for example, a protective tape 25 is adhered. The cathode lead wire 11 is connected to the cathode 21 of the battery element 20, and the anode lead wire 12 is connected to the anode 22. The cathode lead wire 11 and the anode lead wire 12 can be respectively made of a metal or an alloy having conduction. For example, it is preferable that the cathode lead wire 11 is made of aluminum and the anode lead wire 12 is made of nickel. It should be appreciated that other suitable materials or combinations thereof can be used.

The cathode 21 is, for example, composed of a cathode current collector layer 21a and cathode mixture layer 21b, having a structure wherein cathode mixture layer(s) 21b is provided on both sides or single side of the cathode current collector layer 21a. The cathode current collector layer 21a is made of metal foil, such as aluminum foil, nickel foil, stainless foil, the like or combinations thereof. The cathode mixture layer 21b contains, for example, a cathode active material such as lithium phosphorous oxide or the like and a binder a described below, for example, and may additionally contain a conductive agent. Further, the cathode mixture layer 21b is not provided on one end part of the cathode current collector layer 21a, so that the end part is exposed. The cathode lead wire 11 is attached to the exposed end part.

The lithium phosphorous oxide has, for example, an olivine structure. It contains, in an embodiment, at least one first element, such as manganese (Mn), chromium (Cr), cobalt (Co), copper (Cu), nickel (Ni), vanadium (V), molybdenum (Mo), titanium (Ti), zinc (Zn), aluminum (Al), gallium (Ga), magnesium (Mg), boron (B), niobium (Nb), iron (Fe), and the like; lithium; phosphorous; oxygen and the like and combinations thereof. The lithium phosphorous oxide is expressed by, for example, a chemical formula of $Li_xMPO_4$ ($0<x\leq1.2$), wherein M represents the first element. Examples include $LiFe_{0.2}Cu_{0.8}PO_4$, $LiFe_{0.9}Ti_{0.1}PO_4$, $LiFe_{0.8}Zn_{0.2}PO_4$, $LiFe_{0.8}Mg_{0.2}PO_4$, the like and combinations thereof. In particular, lithium-iron-phosphorous composite oxides, which is readily available and inexpensive, are preferable.

The lithium phosphorous oxide provides excellent characteristics in the case where a charge final voltage is controlled to be about 4.0 V or less. Binders described later start to be decomposed when the charge final voltage exceeds about 4.0 V. However, in the case where the lithium phosphorous oxide is used as a cathode active material and the charge final voltage is controlled to be about 4.0 V or less, high battery characteristics can be obtained, which is preferable. As a cathode active material, other materials capable of controlling the charge final voltage to be about 4.0 V or less can be used. It is also possible to combine such materials with the lithium phosphorous oxide.

An average grain diameter of the cathode active material is, for example, preferably in the range from about 0.5 μm to about 3 μm. In this regard, it is believed that the cathode 21 can be smoothed and made into a thin film by downsizing the average grain diameter. Further, by using the binders described later, even when the average grain diameter is downsized, the flexible and smooth cathode 21 can be obtained without increasing a ratio of the binder.

It is preferable to use, for example, a synthetic rubber latex adhesive and a thickener as a binder. It is believed that by using them, the flexible and smooth cathode 21 can be obtained, and electrode peeling and cracking can be prevented. Further, it becomes possible to reduce the amount of the binder compared to in conventional cases, and to increase the ratio of amount of the cathode active material. Moreover, electron transfer can be facilitated, and the internal resistance of the battery can be reduced.

Examples of the synthetic rubber latex adhesive are styrene butadiene rubber latex, nitrile-butadiene rubber latex, methyl methacrylate butadiene rubber latex, chloroprene rubber latex and the like, or the like. Any one of them or a mixture of two or more of them may be used. Examples of the thickener are synthetic polymers, such as polyacrylic acid, polyethylene oxide, polyvinyl alcohol, polyacrylamide; cellulose ether resins such as methyl cellulose, ethyl cellulose, triethyl cellulose, carboxymethyl cellulose, carboxyethyl cellulose, aminoethyl cellulose; or natrium salt type or ammonium salt type of these cellulose ether resins. Any one of them or mixture of two or more of them may be used. It is preferable to use ammonium salt type polyacrylic acid with salt tolerance among the above materials, considering it is relatively inexpensive and easy to use.

It is preferable that, the content of the synthetic rubber latex adhesive in the cathode mixture layer 21b, ranges from about 2 wt % to about 4 wt % with respect to all mass of the cathode mixture layer 21b; and the content of the thickener in the cathode mixture layer 21b ranges from about 0.5 wt % to about 2.5 wt % with respect to all mass of the cathode mixture layer 21b. When the content of the synthetic rubber latex adhesive exceeds the above range, viscosity is remarkably raised in forming the cathode mixture layer 21b, so that application to the cathode current collector layer 21a becomes difficult; and when the content of the synthetic rubber latex adhesive is below the above-described range, the cathode mixture layer 21b becomes fragile, so that sufficient strength cannot be obtained. When the content of the thickener exceeds the above range, gelation is significant in forming the cathode mixture layer 21b, so that application to the cathode current collector layer 21a becomes impossible; and when the content of the thickener becomes less, the cathode mixture layer 21b become fragile, so that sufficient strength cannot be obtained.

It is also preferable to use polyvinylidene fluoride denaturalized by maleic acid (hereinafter referred to as maleic acid-denaturalized polyvinylidene fluoride) as another binder according to an embodiment of the present invention. It is believed that, by using this, an amount of adhesive can also be reduced compared to in conventional cases, since peel strength is improved. A maleic acid-denaturalized amount preferably ranges from about 0.1 wt % to about 0.4 wt %. When a denaturalized amount exceeds the above range, gelation is significant in forming the cathode mixture layer 21b, so that application to the cathode current collector layer 21a becomes impossible; and when a denaturalized amount becomes less, the cathode mixture layer 21b become fragile, so that sufficient strength cannot be obtained.

Further, it is also preferable to use a material obtained by substituting part of maleic acid-denaturalized polyvinylidene fluoride with hexafluoro propylene (HFPr) (hereinafter referred to as HFPr-substituted maleic acid-denaturalized polyvinylidene fluoride) as a binder. It is believed that the application aspect of the cathode mixture is improved, a higher discharge capacity can be obtained, and the cycle characteristics can be improved. Substitution ratio of hexafluoro propylene is preferably about 5 wt % and under, since when the ratio exceeds 5 wt %, though peel strength can be obtained, absorption of electrolyte solution is intense, peeling due to charge and discharge is easy to occur, and cycle life is easy to lower.

It is preferable that a content of maleic acid-denaturalized polyvinylidene fluoride or HFPr-substituted maleic acid-denaturalized polyvinylidene fluoride in the cathode mixture, in an embodiment, ranges from about 0.5 wt % to about 4 wt %. When a content exceeds the above range, gelation in forming the cathode mixture layer 21b is significant, so that application to the cathode current collector layer 21a becomes impossible; and when a content becomes less, the cathode mixture layer 21b become fragile, and sufficient strength cannot be obtained.

Examples of conductive agents are carbon materials such as carbon black, e.g. Ketjen black, graphite the like or combinations thereof. Such carbon material is preferably contained within the cathode active material, and the content in an embodiment preferably ranges from about 5 wt % to about 12 wt % with respect to the total amount of the cathode active material and the carbon material. When the content is less than about 5 wt %, the conductivity decreases, and significant deterioration of the load characteristics and deterioration of charge and discharge capacity occur; and when the content exceeds about 12 wt %, the ratio becomes excess in relation to the cathode active material, bulk density of the cathode mixture layer 21b is large, and further increasing content of the binder becomes necessary, both of which are not preferable.

The anode 22 has a structure, in an embodiment, wherein an anode mixture layer(s) 22b is provided on both sides or single side of an anode current collector layer 22a respectively in a manner similar to in the cathode 21. The anode current collector layer 22a is made of metal foil, such as copper foil, nickel foil, stainless foil and/or the like. The anode mixture layer 22b contains, for example, any one kind or two or more kinds of anode materials capable of inserting and extracting lithium as the electrode active material, and may additionally contain a binder such as polyvinylidene fluoride as necessary. The anode mixture layer 22b are not provided on one end part of the anode current collector layer 22a, so that the end part is exposed. The anode lead wire 12 is attached to this exposed end part.

Examples of anode materials capable of inserting and extracting lithium are carbon materials, metal oxides, high molecular weight materials and the like. As the carbon materials, for example, there are pyrolytic carbons, cokes, graphite, glassy carbons, organic high molecular weight compound fired bodies, carbon fibers, spherical carbons, or activated carbons and the like. The cokes include pitch cokes, needle cokes, petroleum cokes and the like. The organic high molecular weight compound fired bodies denote ones obtained by firing and carbonizing high molecular weight materials such as a phenol resin, a furan resin or the like at appropriate temperature. The carbon fibers include a mesophase carbon fiber or the like. The spherical carbons include mesophase carbon micro beads or the like. Examples of the metal oxides are iron oxide, ruthenium oxide, or molybdenum oxide or the like. Examples of the high molecular weight materials are polyacetylene, polypyrrole, or the like.

As an anode material capable of inserting and extracting lithium, substances, alloys, or compounds of metal elements or semimetal elements, which are capable of forming alloys with lithium. The alloys include, in an embodiment, two or more metal elements, and, in addition, alloy-based materials that include one or more metal elements and one or more semimetal elements. In the structure of each of the materials, solid solution, eutectic (eutectic mixture), or intermetallic compound exists, or two or more of them coexist.

Examples of such metal elements or semimetal elements include tin (Sn), lead (Pb), aluminum (Al), indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y) and the like. An alloy or compound of these elements is expressed by, for example, a chemical formula of $Ma_sMb_tLi_u$, or a chemical formula of $Ma_pMc_qMd_r$. In an embodiment, Ma represents at least one of metal elements and semimetal elements capable of forming an alloy with lithium, Mb represents at least one of metal elements and semimetal elements other then lithium and Ma, Mc represents at least one of non-metal elements, and Md represents at least one of metal elements and semimetal elements other than Ma. The values of s, t, u, p, q, and r satisfy $s>0$, $t\geq0$, $p>0$, $q>0$, and $r\geq0$, respectively.

In an embodiment, a substance, an alloy, or a compound of a group 4B metal element(s) and/or semimetal element(s) is preferable. In an embodiment, silicon and tin, and their alloys and compounds are preferred in crystalline or amorphous state.

Examples of such alloys and compounds are LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_2O$, $Si_v$ ($0<v\leq2$), $SnO_w$ ($0<v\leq2$), $SnSiO_3$, LiSiO, LiSnO and the like.

Any one kind or mixture of two or more of the above can be used for an anode material capable of inserting and extracting lithium according to an embodiment of the present invention.

The electrolyte layer 23 includes, in an embodiment, an electrolyte solution wherein the lithium salt as the electrolyte salt is dissolved in a nonaqueous solvent; and a gel electrolyte containing a high molecular weight material.

Examples of the lithium salts include $LiPF_6$, $LiBF_4$, $LiClO_4$, $LiCF_3SO_3$, $LiN(CF_3SO_2)_2$, $LiN(C_2F_5SO_2)_2$ and the like. One of them, or mixture of two or more of them can be used.

The nonaqueous solvents include, for example, ethylene carbonate, propylene carbonate, butylene carbonate, γ-butyrolactone, γ-valerolactone, 1,2-dimethoxyethane, 1,2-diethoxyethane, tetrahydrofuran, 2-methyl tetrahydrofuran, 1,3-dioxyline, methylacetate, methyl propionate, dimethyl carbonate, diethyl carbonate, ethyl methyl carbonate, 2,4-difluoro anisole, 2,6-difluoro anisole, 4-bromoveratrole and the like. One or mixture of two or more of the nonaqueous solvents can be used.

The high molecular weight materials include polyvinylidene fluoride, polyacrylonitrile, polyethylene oxide, or polymethacrylonitrile and the like. One of them, or mixture of two or more of them can be used corresponding to type of usage.

As the separator 24, for example, an insulative thin film having large ion permeability and a given mechanical strength is used. Specifically, a porous thin film made of a polyolefin material, such as polypropylene, polyethylene and the like, or a porous thin film made of an inorganic material such as a ceramic non woven cloth is used. It is possible to layer two or more kinds of such porous thin films. A thickness of the separator 24 preferably ranges from about 1 μm to about 30 μm, considering the mechanical strength and the battery capacity.

In an embodiment, a secondary battery can be produced as described below.

First, for example, a cathode active material, a binder, and a conductive agent as necessary are mixed. The mixture is dispersed in a solvent such as N-methyl-2-pyrrolidone to thereby obtain the cathode mixture slurry. As a binder, as mentioned above, the synthetic rubber latex adhesive and the thickener, or maleic acid-denaturalized polyvinylidene fluoride, or HFPr-substituted maleic acid-denaturalized polyvinylidene fluoride can be used in an embodiment. After producing the cathode mixture slurry, for example, the cathode mixture slurry is applied on both sides or single side of the cathode current collector layer 21a, dried, and compression molded to form the cathode mixture layer 21b. In such a manner, the cathode 21 is produced. Then, the cathode mixture slurry is not applied on one end part of the cathode current collector layer 21a, and the end part is exposed.

Subsequently, for example, an anode active material, a binder, and a conductive agent as necessary are mixed to prepare an anode mixture. The mixture is dispersed in a solvent such as N-methyl-2-pyrolidone to thereby obtain the anode mixture slurry. After producing the anode mixture slurry, for example, this anode mixture slurry is applied on both sides or single side of the anode current collector layer 22a, dried, and compression molded to form the anode mixture layer 22b. In such a manner, the anode 22 is produced. Then, the anode mixture slurry is not applied on one end part of the anode current collector layer 22a, and the end part is exposed.

After producing the cathode 21 and the anode 22, for example, the cathode lead wire 11 is attached to the exposed part of the cathode current collector layer 21a, and the anode lead wire 12 is attached to the exposed part of the anode current collector layer 22a respectively by resistance welding, ultrasonic welding or the like.

Subsequently, for example, the electrolyte layer 23 made of a gel electrolyte is formed on the cathode mixture layer 21b and the anode mixture layer 22b. The electrolyte layer 23 are, for example, formed by mixing an electrolyte solution, a high molecular weight material, and dimethyl carbonate which is a solvent of this high molecular weight material; applying this mixture on the cathode mixture layer 21b or the anode mixture layer 22b; drying it, and volatilizing the solvent.

After forming the electrolyte layer 23, for example, as shown in FIG. 2, the separator 24, the cathode 21 formed with the electrolyte layer 23, the separator 24, and the anode 22 formed with the electrolyte layer 23 are sequentially layered and wound, and the protective tape 25 is, for example, adhered at the outermost circumferential part. In this manner, the battery element 20 is formed.

After producing the battery element 20, the exterior members 30a and 30b made of e.g. aluminum laminated films are prepared, between which the battery element 20 is sandwiched. In the reduced-pressure atmosphere, the exterior members 30a and 30b are crimped to the battery element 20, which is enclosed by contacting outer edges of the exterior members 30a and 30b by heat anastomoses or the like. Then, for example, the adhesive film 31 is inserted between the cathode lead wire 11 and the anode lead wire 12 and the exterior members 30a and 30b, and the cathode lead wire 11 and the anode lead wire 12 are projected from the exterior members 30a and 30b. In this manner, assembly of the secondary battery is completed. A shape of the secondary battery is not limited to the shape shown in FIGS. 1 and 2, and other shapes are contemplated within the scope of the present invention.

After assembling the secondary battery, for example, the secondary battery is heated to higher temperature than normal temperatures while being uniaxial pressurized. Namely, the battery element 20 is heated while being pressurized through the exterior members 30a and 30b. In this way, the electrolyte solution contained in the electrolyte layer 23 is penetrated in the cathode mixture layer 21b and the anode mixture layer 22b, so that the adhesion between the electrolyte layer 23 and the cathode 21 and the anode 22 is raised. Additionally, the adhesion between each electrode active material is raised, and the contact resistance of the electrode active material is lowered. Through the above processes, the secondary battery is completed.

In the secondary battery, when charge is performed, for example, lithium ions extract from the cathode 21, and are inserted into the anode 22 via the electrolyte layer 23 and the separator 24. When discharge is performed, for example, lithium ions extract from the anode 22, and are inserted into the cathode 21 via the electrolyte layer 23 and the separator 24. In this case, an amount of the binder contained in the cathode mixture layer 21b is suppressed to be a small amount, and the content of the electrode active material is increased. Therefore, internal resistance in the battery is reduced, the charge and discharge capacity and the charge and discharge cycle life are improved, and particularly the load characteristics are improved.

The charge final voltage is about 4.0 V or less in an embodiment. When it exceeds about 4.0 V, the above-mentioned binder contained in the cathode mixture layer 21b is decomposed, thereby causing lowering of the cycle characteristics and load discharge capacity. However, when a lithium phosphorous oxide is used as a cathode active material, excellent battery characteristics can be obtained with the charge final voltage of about 4.0 V or less.

As discussed above, in an embodiment, effective amounts of the synthetic rubber latex adhesive and the thickener are contained in the cathode mixture layer 21b as a binder. Therefore, the flexible and smooth cathode 21 can be obtained, and electrode peeling and cracking can be prevented. Additionally, effective amounts of the synthetic rubber latex adhesive and the thickener, or maleic acid-denaturalized polyvinylidene fluoride are contained, so that a content of the binder lowers, the ratio of the cathode active material in the cathode mixture layer 21b and the capacity of the cathode 21 can be increased, and electron transfer in the cathode 21 can be facilitated. Therefore, the charge and discharge capacity, and the charge and discharge cycle life can be improved, and the load characteristics can be improved.

In particular, in the case where denaturalized amount of maleic acid-denaturalized polyvinylidene fluoride ranges from about 0.1 wt % to about 0.4 wt %, and part of maleic acid-denaturalized polyvinylidene fluoride is substituted with hexafluoropropylene of about 5 wt % or less, a higher discharge capacity can be obtained, and the cycle characteristics and the high load characteristics can be further improved.

Examples of the present invention, without limitation, will be described below in greater detail with reference to FIGS. 1 and 2.

EXAMPLES 1-1 and 1-2

First, as a cathode active material, lithium iron phosphorous oxide ($LiFePO_4$) as the lithium phosphorous oxide was prepared under the following conditions. Lithium phosphate and phosphorous iron (II) oxide octahydrate were mixed at an element ratio of lithium:iron=1:1. Ketjen black powders were added to the mixture, so that its ratio was 10% of the whole fired material obtained after firing, thereby obtaining a mixed sample. This mixed sample was put in an alumina container, and milling was made by a planetary ball mill at a weight ratio of sample:alumina ball that equaled 50%, at a number of revolutions of 250 rpm, and for operation time of 10 hours. After that, the mixed sample was put in a ceramic pot, and was fired in an electric furnace in the nitrogen atmosphere at 600° C. for 5 hours, thereby obtaining a fired material of $LiFePO_4$ containing a carbon material.

The cathode mixture was prepared by using the $LiFePO_4$ as the cathode active material, sufficiently kneading the fired material of $LiFePO_4$ containing the carbon material, and ammonium salt polyacrylic acid (PAA) in a planetary mixer, and adding styrene butadiene rubber latex (SBR) to the mixture. Then, a mass ratio of the fired material of $LiFePO_4$ containing the carbon material: ammonium salt polyacrylic acid:styrene butadiene rubber latex was (99−x):1:x. The value of x was varied as shown in Examples 1-1 and 1-2 in Table 1. The cathode mixture was dispersed in N-methyl-2-pyrrolidone, thereby obtaining the cathode mixture slurry. Then, the cathode mixture slurry was uniformly applied on both sides of the cathode current collector layer 21*a* made of a strip-shaped aluminum foil, and dried. After that, compression molding was performed by a roller pressing machine, thereby forming the strip-shaped cathode mixture layer 21*b*, which were cut in a given size to produce the sheet cathode 21.

Next, mesophase carbon micro beads as the anode active material and polyvinylidene fluoride as a binder were mixed at a mass ratio of 90:10, to thereby prepare an anode mixture. Subsequently, N-methyl-2-pyrrolidone as the solvent was added to this anode mixture, which was then stirred and mixed to obtain an anode mixture slurry. Subsequently, the anode mixture slurry was uniformly applied on both sides of the anode current collector layer 22*a* made of a strip-shaped copper foil and dried. After that, compression molding was performed by a roller pressing machine to form the strip-shaped anode mixture layer 22*b*, which were cut in a given size to produce the sheet anode 22.

Further, $LiPF_6$ was dissolved in a solvent wherein ethylene carbonate and propylene carbonate were mixed to produce an electrolyte solution. After that, the electrolyte solution, a high molecular weight material, and dimethyl carbonate as the solvent of this high molecular weight material were mixed and stirred to obtain a gel electrolyte.

After producing the cathode 21, the anode 22, and the electrolyte, the cathode lead wire 11 was attached to the cathode current collector layer 21*a*, the electrolyte was applied to the cathode mixture layer 21*b*, dimethyl carbonate was evaporated, thereby forming the electrolyte layer 23. Additionally, the anode lead wire 12 was attached to the anode current collector layer 22*a*, the electrolyte was applied to the anode mixture layer 22*b*, dimethyl carbonate was evaporated, thereby forming the electrolyte layer 23. Then, a pair of separator 24 made of a micro-porous polypropylene film with a thickness of 9 μm was prepared. The separator 24, the cathode 21, the separator 24, and the anode 22 were sequentially layered in this order and wound, and the protective tape 25 was adhered, thereby obtaining the battery element 20. The battery elements 20 were produced for Examples 1-1 and 1-2 respectively.

Peel strength tests were conducted for the battery elements 20 of Examples 1-1 and 1-2 produced as above, based on JIS B 7721. Obtained results are shown in Table 1. The peel strength tests in Table 1 were evaluated as "Strong" when binding force is 7 gf/mm and above; "Sufficient" when binding force is 2 gf/mm and above, and less than 7 gf/mm; and "Insufficient" when binding force is less than 2 gf/mm.

As Comparative Examples 1-1 and 1-2 to be compared with Examples 1-1 and 1-2, the battery elements 20 were produced in a manner similar to Examples 1-1 and 1-2, except that the value of x in (99−x):1:x, which is a mass ratio of the fired material of $LiFePO_4$ containing a carbon material to ammonium salt polyacrylic acid to styrene butadiene rubber latex, was varied as shown in Table 1. Further, as Comparative Examples 1-3 and 1-4 to be compared with Examples 1-1 and

TABLE 1

| | Binder | SBR mass ratio x | PAA mass ratio | PVDF mass ratio y | Mass ratio of total amount of binder | Peel strength test |
|---|---|---|---|---|---|---|
| Example 1-1 | SBR + PAA | 2 | 1 | — | 3 | Sufficient |
| Example 1-2 | SBR + PAA | 4 | 1 | — | 5 | Strong |
| Comparative Example 1-1 | SBR + PAA | 1 | 1 | — | 2 | Insufficient |
| Comparative Example 1-2 | SBR + PAA | 5 | 1 | — | 6 | Measurement impossible |
| Comparative Example 1-3 | PVDF | — | — | 3 | 3 | Insufficient |
| Comparative Example 1-4 | PVDF | — | — | 6 | 6 | Sufficient |

1-2, the battery elements 20 were produced in a manner similar to Examples 1-1 and 1-2, except that a binder made of polyvinylidene fluoride (PVDF) was used instead of the binder made of ammonium salt polyacrylic acid and styrene butadiene rubber latex, and the cathode mixture was made at a mass ratio of a fired material of $LiFePO_4$ containing a carbon material:polyvinylidene fluoride=(100−y):y. The value of y was varied as shown in Comparative Examples 1-3 and 1-4 in Table 1. Comparative Example 1-4 is a typical example of a binder contained in a conventional cathode mixture. The peel strength tests were also conducted for Comparative Examples 1-1 to 1-4 in a manner similar to Examples 1-1 and 1-2. Obtained results are shown in Table 1.

As evidenced by Table 1, sufficient binding force was obtained in Example 1-1, and strong binding force was obtained in Example 1-2. In Comparative Example 1-1, however, sufficient binding force could not be obtained. It is believed, for example, that this result was due to the amount of styrene butadiene rubber latex as the binder that was too small. In Comparative Example of binder 1-2, viscosity of the cathode mixture was significantly raised, and application to the cathode current collector layer 21a could not be performed well. It is believed, for example, that this resulted because the amount of styrene butadiene rubber latex as the binder was too great. In Comparative Example 1-3, containing polyvinylidene fluoride of 3 wt %, no binding force was observed, and significant peeling was shown at the electrode. In Comparative Example 1-4, containing polyvinylidene fluoride of 6 wt %, though sufficient binding force was obtained, the content of the binder was too great.

In this regard, it was found that by using ammonium salt polyacrylic acid and styrene butadiene rubber latex as a binder, and setting the content of styrene butadiene rubber latex to the range from about 2 wt % to about 4 wt %, an amount of binder became smaller, and the cathode and the secondary battery with sufficient binding force, for example, high strength could be obtained.

EXAMPLES 2-1 and 2-2

The rolled battery elements 20 were produced in a manner similar to Example 1-1, except that the value of z in (98−z):z:2, which is a mass ratio of a fired material of $LiFePO_4$ containing a carbon material to ammonium salt polyacrylic acid to styrene butadiene rubber latex, was varied as shown in Table 2. The peel strength tests were conducted for the battery elements 20 of Examples 2-1 and 2-2 made as above in similar way to Example 1-1. Obtained results are shown in Table 2. The peel strength tests in Table 2 were evaluated in a manner similar to Table 1.

As Comparative Examples 2-1 and 2-2 to be compared with Examples 2-1 and 2-2, the battery elements 20 were produced in a manner similar to Examples 2-1 and 2-2, except that the value of z in (98−z):z:2, which is a mass ratio of the fired material of $LiFePO_4$ containing a carbon material to ammonium salt polyacrylic acid to styrene butadiene rubber latex, was varied as shown in Table 2. The peel strength tests were also conducted for Comparative Examples 2-1 and 2-2 in a manner similar to Examples 2-1 and 2-2. Obtained results are shown in Table 2.

As evidenced by Table 2, sufficient binding force was obtained in Examples 2-1 and 2-2. In Comparative Example 2-1, however, the binding force was insufficient. It is believed, for example, that this resulted because the content of ammonium polyacrylic acid was too small. In Comparative Example 2-2, gelation of the cathode mixture was significant, so that application to the cathode current collector layer 21a was impossible. It is believed, for example, that this resulted because the content of ammonium polyacrylic acid was too much.

In this regard, it was found that by using ammonium salt polyacrylic acid and styrene butadiene rubber latex as a binder, and setting the content of ammonium salt polyacrylic acid to the range from about 0.5 wt % to about 2.5 wt %, thickening effect was properly given to the cathode mixture, and sufficient binding force could be obtained.

EXAMPLES 3-1 and 3-2

The battery elements 20 were produced in a manner similar to Example 1-1, except that a mass ratio of a fired material of $LiFePO_4$ containing a carbon material to ammonium salt polyacrylic acid to styrene butadiene rubber latex, was set to 97:1:2. Subsequently, the exterior members 30a and 30b made of aluminum laminated films were prepared, the adhesive film 31 was arranged between the cathode lead wire 11 and the anode lead wire 12 and the exterior members 30a/30b, and the battery elements 20 were vacuum packaged. In this manner, the secondary batteries were assembled.

Charge and discharge cycle tests and high load discharge tests were conducted for the secondary batteries of Examples 3-1 and 3-2 produced as above. Obtained results are shown in Table 3.

The charge and discharge cycle tests were conducted as follows. First, charging was performed with a constant current of 100 mA until the charge final voltage shown in Table 3 was attained. After that, discharging was performed with a constant current of 100 mA until the battery voltage reached 2.0 V. Charge and discharge were repeated under the same

TABLE 2

|  | Binder | SBR mass ratio | PAA mass ratio z | Mass ratio of total amount of binder | Peel strength test |
|---|---|---|---|---|---|
| Example 2-1 | SBR + PAA | 2 | 0.5 | 2.5 | Sufficient |
| Example 2-2 | SBR + PAA | 2 | 2.5 | 4.5 | Sufficient |
| Comparative Example 2-1 | SBR + PAA | 2 | 0.3 | 2.3 | Insufficient |
| Comparative Example 2-2 | SBR + PAA | 2 | 3 | 5 | Measurement impossible | conditions, and the discharge capacity of the 10th cycle, wherein the charge and discharge capacity settled was measured respectively.

when the total amount of the binder was decreased, excellent cycle characteristics were obtained, and the high load discharge capacity was improved.

TABLE 3

| | Cathode active material | Binder | Binder (wt %) | Charge final voltage (V) | Discharge capacity of the 10$^{th}$ cycle (mAh) | 1000 mA high load discharge capacity (mAh) |
|---|---|---|---|---|---|---|
| Example 3-1 | LiFePO$_4$ | SBR + PAA | 3 | 3.6 | 519 | 421 |
| Example 3-2 | LiFePO$_4$ | SBR + PAA | 3 | 4.0 | 523 | 413 |
| Comparative Example 3-1 | LiFePO$_4$ | SBR + PAA | 3 | 4.2 | 273 | 138 |
| Comparative Example 3-2 | LiCoO$_2$ | PVDF | 6 | 4.2 | 485 | 342 |

High load charge and discharge tests were conducted as follows. First, charging was performed with a constant current of 100 mA until the charge final voltage shown in Table 3 was attained. After that, discharging was performed with a constant current of 1000 mA until the battery voltage reached 2.0 V, and respective discharge capacities were measured.

As to the secondary batteries of Comparative Example 3-1 to be compared with Examples 3-1 and 3-2, made in a manner similar to Example 3-1, the charge and discharge cycle tests and the high load charge and discharge tests were conducted in a manner similar to Examples 3-1 and 3-2, except that the charge final voltage was 4.2 V. Obtained results were shown in Table 3. As to the secondary batteries of Comparative Example 3-2 to be compared with Examples 3-1 and 3-2, made in a manner similar to Example 3-1, except that LiCoO$_2$ was used as a cathode active material, and polyvinylidene fluoride of 6 wt % was used as a binder at a mass ratio of 94:6, the charge and discharge cycle tests and the high load charge and discharge tests were conducted in a manner similar to Examples 3-1 and 3-2, except that the charge final voltage was 4.2 V. Obtained results are shown in Table 3. The cathode mixture of Comparative Example 3-2 is a conventionally typical example.

As evidenced by Table 3, according to Examples 3-1 and 3-2, the discharge capacities of the 10th cycle were high, such as 519 mAh and above, and the high load discharge capacities of 1000 mA were high, such as 413 mAh and above. Meanwhile, in Comparative Example 3-1, the discharge capacity of the 10th cycle was 273 mAh and the high load discharge capacity was 138 mAh, such as, both capacities were very low. In this regard, it was shown that in Examples 3-1 and 3-2, the cycle characteristics and the high load discharge capacity were improved. It is believed, for example, that when charge OCV (open circuit voltage) has a potential of 4.0 V and under, ammonium salt polyacrylic acid and styrene butadiene rubber latex were not decomposed, and when its potential was 4.2 V and above, ammonium salt polyacrylic acid and synthetic rubber latex were decomposed. In Comparative Example 3-2, the content of the binder was twice as large as in Examples of 3-1 and 3-2, and the discharge capacity of the 10th cycle was not low, such as 485 mAh, but the high load discharge capacity was low, such as 342 mAh. In this regard, it was confirmed that in the case where ammonium salt polyacrylic acid and styrene butadiene rubber latex were used as a binder, even In this regard, it was confirmed that when the charge final voltage was not over 4.0 V, ammonium salt polyacrylic acid and styrene butadiene rubber latex could be used as a binder, so that the content of the binder can be lowered, and the cycle characteristics and the high load discharge capacity were improved.

In Examples 1-1 to 3-2, ammonium salt polyacrylic acid was used as a thickener. However, the same effect was confirmed when natrium salt polyacrylic acid, ammonium salt carboxymethyl cellulose, or natrium salt carboxymethyl cellulose was used.

In Examples 1-1 to 3-2, LiFePO$_4$ was used as a cathode active material. However, when using other systems whose charge final voltage was not over 4.0 V, such as LiFe$_{0.2}$Cu$_{0.8}$PO$_4$, LiFe$_{0.9}$Ti$_{0.1}$PO$_4$, LiFe$_{0.8}$Zn$_{0.2}$PO$_4$, LiFe$_{0.8}$Mg$_{0.2}$PO$_4$ and the like as a cathode active material, similar effect was confirmed.

The results of Examples 1-1 to 3-2 demonstrate that by using a synthetic rubber latex adhesive, such as styrene butadiene rubber latex, and a thickener, such as ammonium salt polyacrylic acid, as a binder of the cathode 21 in the secondary battery with its charge final voltage of about 4.0 V or less, the cycle characteristics and the high load discharge capacity can be improved. In this regard, it was found that the secondary battery, wherein the charge and discharge capacity, the capacity maintenance ratio, and the discharge cycle life were improved, particularly the load characteristics was improved, could be obtained.

In the above examples, descriptions were made on materials for the synthetic rubber latex adhesive and the thickener with concrete examples. However, similar results can also be obtained and contemplated when using materials with other suitable structures according to an embodiment of the present invention.

EXAMPLES 4-1 and 4-2

The battery elements 20 were produced in a manner similar to Example 1-1, except that a cathode mixture was prepared as follows. First, a cathode mixture was prepared by sufficiently kneading a fired material of LiFePO$_4$ containing a carbon material, and polyvinylidene fluoride denaturalized by maleic acid, and partly substituted with hexafluoro propylene (HFPr) (hereinafter referred to as HFPr-substituted maleic acid-denaturalized PVDF). Here, amount denaturalized by maleic acid in HFPr-substituted maleic acid-denaturalized PVDF was 0.3 wt %, and amount of hexafluoro propylene used for hexafluoro propylene substitution (hereinafter referred to as HFPr-substituted amount) was 3 wt %. A mass ratio of the fired material of LiFePO$_4$ containing the carbon material and the binder comprised of HFPr-substituted maleic acid-denaturalized PVDF was set to (100−p):p. The value of p was changed as shown in Examples 4-1 and 4-2 in Table 4. The peel strength tests were conducted in a manner similar to Example 1-1, for the battery elements 20 of Examples 4-1 and 4-2 produced as above. Obtained results are shown in Table 4. The peel strength tests in Table 4 were evaluated in a manner similar to Table 1.

TABLE 4

|  | Binder | Maleic acid-denaturalized amount (wt %) | HFPr-substituted amount (wt %) | Binder mass ratio p | Peel strength test |
|---|---|---|---|---|---|
| Example 4-1 | HFPr-substituted maleic acid-denaturalized PVDF | 0.3 | 3 | 0.5 | Sufficient |
| Example 4-2 | HFPr-substituted maleic acid-denaturalized PVDF | 0.3 | 3 | 4 | Strong |
| Comparative Example 4-1 | HFPr-substituted maleic acid-denaturalized PVDF | 0.3 | 3 | 0.3 | Insufficient |
| Comparative Example 4-2 | HFPr-substituted maleic acid-denaturalized PVDF | 0.3 | 3 | 5 | Measurement impossible |
| Comparative Example 1-3 | PVDF | — | — | 3 | Insufficient |
| Comparative Example 1-4 | PVDF | — | — | 6 | Sufficient |

As Comparative Examples 4-1 and 4-2 to be compared with Examples 4-1 and 4-2, the battery elements 20 were produced in a manner similar to Examples 4-1 and 4-2 except that the value of p in (100−p):p, a mass ratio of a fired material of LiFePO$_4$ containing a carbon material and a binder made of HFPr-substituted maleic acid-denaturalized PVDF was varied as shown in Table 4. The peel strength tests were also conducted for Comparative Examples 4-1 and 4-2 in a manner similar to Examples 4-1 and 4-2. Obtained results are shown in Table 4. As comparative examples to Examples 4-1 and 4-2, the results of Comparative Examples 1-3 and 1-4 are also shown in Table 4. The polyvinylidene fluoride used in Comparative Examples 1-3 and 1-4 was neither denaturalized by maleic acid nor substituted with hexafluoro propylene.

As evidenced by Table 4, sufficient binding force was obtained in Example 4-1, and strong binding force was obtained in Example 4-2. In Comparative Example 4-1, however, sufficient binding force could not be obtained. It is believed, for example, this was due because the amount of HFPr-substituted maleic acid-denaturalized PVDF as the binder was too small. In Comparative Example 4-2, gelation of the cathode mixture was significant, so that application to the cathode current collector layer 21a was not performed well. It is believed, for example, this was due because the amount of HFPr-substituted maleic acid-denaturalized PVDF as the binder was too much. In Comparative Example 1-3 containing polyvinylidene fluoride of 3 wt %, no binding force was shown, and drastic peeling appeared at the electrode. In Comparative Example 4-4 containing polyvinylidene fluoride of 6 wt %, though sufficient binding force was obtained, the content of the binder was too much.

In this regard, it was found that by using HFPr-substituted maleic acid-denaturalized PVDF as a binder and setting a content of HFPr-substituted maleic acid-denaturalized PVDF ranges from about 0.5 wt % to about 4 wt %, a content of binder became small, and the cathode and the secondary battery with sufficient binding force, i.e. high strength were obtained.

EXAMPLES 5-1 to 5-2

The rolled battery elements 20 were produced in a manner similar to Example 4-1, except that an amount denaturalized by maleic acid of HFPr-substituted maleic acid-denaturalized PVDF was varied as shown in Table 5, and a mass ratio of a fired material of LiFePO$_4$ containing a carbon material to HFPr-substituted maleic acid-denaturalized PVDF was set to 98:2. The peel strength tests were conducted for the battery elements 20 of Examples 5-1 and 5-2 made as above in a manner similar to Example 4-1. Obtained results are shown in Table 5. The peel strength tests in Table 5 were evaluated in a manner similar to Table 4.

TABLE 5

|  | Binder | Maleic acid-denaturalized amount (wt %) | HFPr-substituted amount (wt %) | Binder mass ratio p | Peel strength test |
|---|---|---|---|---|---|
| Example 5-1 | HFPr-substituted maleic acid-denaturalized PVDF | 0.1 | 3 | 2 | Sufficient |
| Example 5-2 | HFPr-substituted maleic acid-denaturalized PVDF | 0.4 | 3 | 2 | Strong |
| Comparative Example 5-1 | HFPr-substituted maleic acid-denaturalized PVDF | 0.05 | 3 | 2 | Insufficient |
| Comparative Example 5-2 | HFPr-substituted maleic acid-denaturalized PVDF | 0.5 | 3 | 2 | Measurement impossible |

As Comparative Examples 5-1 and 5-2 to be compared with Examples 5-1 and 5-2, the rolled battery elements 20 were produced in a manner similar to Example 4-1, except that an amount denaturalized by maleic acid of HFPr-substituted maleic acid-denaturalized PVDF was varied as shown in Table 5, and a mass ratio of a fired material of LiFePO$_4$ containing a carbon material to HFPr-substituted maleic acid-denaturalized PVDF was set to 98:2. The peel strength tests were also conducted for Comparative Examples 5-1 and 5-2 in a manner similar to Examples 5-1 and 5-2. Obtained results are shown in Table 5.

As evidenced by Table 5, sufficient binding force was obtained in Examples 5-1, and strong binding force was obtained in Example 5-2. In Comparative Example 5-1, however, the binding force was insufficient and the cathode 21 with insufficient strength was obtained. It is believed, for example, this resulted because the amount denaturalized by maleic acid was too small. In Comparative Example 5-2, gelation of the cathode mixture was significant, so that application to the cathode current collector layer 21a was impossible. It is believed, for example, this resulted because the amount denaturalized by maleic acid was too much.

In this regard, it was found that by using HFPr-substituted maleic acid-denaturalized PVDF as a binder and the maleic acid-denaturalized amount of HFPr substituted-maleic acid-denaturalized PVDF that ranges from about 0.1 wt % to about 0.4 wt %, the cathode with sufficient binding force, such as high strength and the secondary battery were obtained, and reduction of the amount of binder was supported.

EXAMPLES 6-1 to 6-3

Cathode mixture was prepared by setting a mass ratio of a fired material of LiFePO$_4$ containing a carbon material, to maleic acid-denaturalized polyvinylidene fluoride (hereinafter referred to as maleic acid-denaturalized PVDF) to 98:2. The maleic acid-denaturalized amount of maleic acid-denaturalized PVDF was 0.3 wt %, and amount of hexafluoro propylene used for hexafluoro propylene substitution (hereinafter referred to as HFPr-substituted amount) was varied as shown in Table 6. Then, the battery elements 20 were formed in a manner similar to Example 4-1 except for the above.

Further, the external members 30a and 30b made of aluminum laminated films were prepared, adhesive film 31 was arranged between the cathode lead wire 11 and anode lead wire 12 and the external materials 30a and 30b, and the battery elements 20 of Examples 6-1 to 6-3 produced as above were vacuum packaged. In this way, the secondary battery was assembled.

The charge and discharge cycle tests and the high load discharge tests were conducted for the secondary batteries of Examples 6-1 to 6-3 made as above, in a manner similar to Examples 3-1 and 3-2. Obtained results are shown in Table 6.

As evidenced by Table 6, strong binding force was obtained in any of Examples 6-1 to 6-3. In this regard, it was found that by using maleic acid-denaturalized PVDF or HFPr-substituted maleic acid-denaturalized PVDF as a binder, a content of the binder became less, and the cathode and the secondary battery with sufficient binding force, such as high strength, were obtained.

Further, as evidenced by Table 6, according to Examples 6-1 and 6-2, the discharge capacities of the 10th cycle were high, such as 509 mAh and above, and the high load discharge capacities of 1000 mA were high, such as 398 mAh and above. Meanwhile, in Example 6-3, the discharge capacity of the 10th cycle was 295 mAh and the high load discharge capacity was 152 mAh, such as both capacities were low.

In this regard, it was confirmed that by using HFPr-substituted maleic acid-denaturalized PVDF whose HFPr-substituted amount of 5 wt % and under, the cycle characteristics and the high load discharge capacity were improved.

EXAMPLES 7-1 and 7-2

The secondary batteries were produced in a manner similar to Example 6-1, except that HFPr-substituted maleic acid-denaturalized polyvinylidene fluoride of 2 wt % whose maleic acid-denaturalized amount was 0.3 wt % and HFPr-substituted amount was 3 wt %, was used as a binder.

The charge and discharge cycle tests and the high load discharge tests were conducted for the secondary batteries of

TABLE 6

| | HFPr-substituted amount (wt %) | Binder (wt %) | Peel strength test | Discharge capacity of the 10th cycle (mAh) | 1000 mA high load discharge capacity (mAh) |
|---|---|---|---|---|---|
| Example 6-1 | 5 | 2 | Strong | 521 | 418 |
| Example 6-2 | No substitution | 2 | Strong | 509 | 398 |
| Example 6-3 | 6 | 2 | Strong | 295 | 152 |

The peel strength tests were conducted in a manner similar to Example 4-1 for the battery elements 20 of Examples 6-1 to 6-3 made as above. Obtained results are shown in Table 6. The peel strength tests in Table 6 were evaluated in a manner similar to Table 4.

Examples 7-1 and 7-2 produced as above. Obtained results are shown in Table 7. The charge and discharge cycle tests and the high load discharge tests were conducted in a manner similar to Examples 6-1 and 6-2, except that the charge final voltage was varied as shown in Table 7.

TABLE 7

|  | Cathode active material | Binder | Binder (wt %) | Charge final voltage (V) | Discharge capacity of the 10th cycle (mAh) | 1000 mA high load discharge capacity (mAh) |
|---|---|---|---|---|---|---|
| Example 7-1 | LiFePO$_4$ | HFPr-substituted maleic acid-denaturalized PVDF | 2 | 3.6 | 522 | 420 |
| Example 7-2 | LiFePO$_4$ | HFPr-substituted maleic acid-denaturalized PVDF | 2 | 4.0 | 528 | 417 |
| Comparative Example 7-1 | LiFePO$_4$ | HFPr-substituted maleic acid-denaturalized PVDF | 2 | 4.2 | 276 | 140 |
| Comparative Example 7-2 | LiCoO$_2$ | PVDF | 6 | 4.2 | 502 | 342 |

As to the secondary battery of Comparative Example 7-1 to be compared with Examples 7-1 and 7-2, made in a manner similar to Example 7-1, the charge and discharge cycle tests and the high load discharge tests were conducted in a manner similar to Examples 7-1 and 7-2, except that the charge final voltage was 4.2 V. Obtained results are shown in Table 7. As Comparative Example 7-2 to be compared with Examples 7-1 and 7-2, a secondary battery was produced in a manner similar to Comparative Example 3-2. Then, the charge and discharge cycle tests and the high load discharge tests were conducted for the secondary battery of this Comparative Example 7-2, in a manner similar to Examples 7-1 and 7-2, except that the charge final voltage was set to 4.2 V. Obtained results are shown in Table 7.

As evidenced by Table 7, according to Examples 7-1 and 7-2, the discharge capacities of the 10th cycle were high, such as 522 mAh and above, and the high load discharge capacities of 1000 mA were high, such as 417 mAh and above. Meanwhile, in Comparative Example 7-1, the discharge capacity of the 10th cycle was 276 mAh and the high load discharge capacity was 140 mAh, such as both capacities were very low. In this regard, it was shown that in Examples 7-1 and 7-2, the cycle characteristics and the high load discharge capacity were improved. It is believed, for example, that when charge OCV has a potential of 4.0 V and under, maleic acid-denaturalized PVDF was not decomposed, and when its potential was 4.2 V and above, maleic acid-denaturalized PVDF was decomposed. In Comparative Example 7-2, the amount of the binder was three times as large as in Examples 7-1 and 7-2, and the discharge capacity of the 10th cycle was not low, such as 502 mAh, but the high load discharge capacity was low, such as 342 mAh. In this regard, it was confirmed that in the case where maleic acid-denaturalized PVDF was used as a binder, even when the total amount of the binder was decreased, excellent cycle characteristics were obtained, and the high load discharge capacity was improved.

Further, it was confirmed that when the charge final voltage was not over 4.0 V, maleic acid-denaturalized PVDF could be used as a binder, so that a content of the binder can be lowered, and the cycle characteristics and the high load discharge capacity were improved.

In Examples 4-1 to 7-2, LiFePO$_4$ was used as a cathode active material. The same effect was confirmed when other system with final charge voltage of 4.0 V and under, such as LiFe$_{0.2}$Cu$_{0.8}$PO$_4$, LiFe$_{0.9}$Ti$_{0.1}$PO$_4$, LiFe$_{0.8}$Zn$_{0.2}$PO$_4$, LiFe$_{0.8}$Mg$_{0.2}$PO$_4$, and the like was used as a cathode active material.

Therefore, it was found that, according to Examples 4-1 to 7-2, by using maleic acid-denaturalized PVDF as a binder of the cathode 21 in the secondary battery with its charge final voltage of 4.0 V and under, the cathode 21 with high strength could be obtained. Further, it was found that the cycle characteristics and the high load discharge capacity were improved. In particular, it was found that by using HFPr-substituted maleic acid-denaturalized PVDF as a binder of the cathode 21, the cycle characteristics and the high load discharge capacity were further improved. In this regard, it was found that the charge and discharge capacity, the capacity maintenance ratio, and the discharge cycle life were improved, and in particular, the secondary battery with improved load characteristics could be obtained.

As described above, the present invention, in an embodiment, includes lithium iron phosphorus oxide as a cathode active material. However, similar results can be obtained when any suitable cathode active material which can realize the secondary battery with its charge final voltage of about 4.0 V or less, is used. Further, as described above, the present invention, in an embodiment, includes the secondary batteries using lithium as electrode reactive species. However, the similar result can be obtained when any suitable cathode active material, which can realize the secondary battery with its charge final voltage of 4.0 V and under, is used.

Though the invention has been described by the embodiment and the examples, the present invention is not limited to the embodiment and examples but can be modified in any various and suitable manner. For example, the battery element is enclosed inside of the exterior members made of aluminum laminated films in the embodiment and examples but, it can be enclosed inside of the exterior members made of other laminated films in an embodiment.

Further, the gel electrolyte is used in an embodiment and examples discussed above, but other electrolytes, for example, electrolyte solution, i.e. the liquid electrolyte, a solid high molecular weight electrolyte which is obtained by dispersing electrolyte salt in a high molecular weight compound with ion conductivity, a solid inorganic electrolyte or the like can be used in an embodiment.

For the solid electrolytes as the high molecular weight compounds, for example, either high molecular weight compounds such as polyethylene oxide or cross-linked polymer including polyethylene oxide, ester high molecular weight compounds such as polymethacrylate, or acrylate high molecular weight materials or the like can be used independently, by mixture, or in copolymerization in molecules in an embodiment. Further, as an inorganic conductor, polycrystal of lithium nitride, lithium iodide, or lithium hydroxide; a mixture of lithium iodide and dichromium trioxide, or a mixture of lithium iodide, lithium sulfide; and diphosphorus subsulfide; and the like in an embodiment can be used.

Further, the cathode and the anode are wound in the embodiment and examples described above but, the cathode and the anode can be folded, piled or configured in other suitable manners.

Further, an example about the secondary battery whose battery element with winding structure is enclosed inside the exterior members is specifically described in an embodiment and examples as discussed above. However, the invention can be applied to secondary batteries having other structures. Additionally, the present invention can be similarly applied to a cylindrical secondary battery, secondary batteries having other shapes, such as a coin shape, a button shape, a square shape or the like.

As described above, according to the cathode or the battery pursuant to an embodiment of the present invention, effective amounts of the synthetic rubber latex adhesive and the thickener are contained in the cathode mixture layer as a binder, so that flexibility and smoothness can be improved, and electrode peeling and cracking can be prevented. Further, effective amounts of the synthetic rubber latex adhesive and the thickener, or maleic acid-denaturalized polyvinylidene fluoride is contained, so that a content of the binder is lowered to increase ratio and capacity of the cathode active material, and electron transfer in the cathode can be facilitated. Thus, the charge and discharge capacity and the charge and discharge cycle life can be improved, and the load characteristics can be improved.

According to the cathode or the battery pursuant to an embodiment of the present invention, a lithium phosphorous oxide having an olivine structure is contained as a cathode active material, so that excellent battery characteristics can be obtained when the charge final voltage is 4.0 V and under.

Further, according to the cathode or the battery pursuant to an embodiment of the present invention, an effective amount of a carbon material is contained in the cathode active material, so that excellent conductivity can be obtained, and the load characteristics and the charge and discharge capacity can be further improved.

Furthermore, according to the cathode or the battery pursuant to an embodiment of the present invention, an amount of maleic acid-denaturalized polyvinylidene fluoride ranges from about 0.1 wt % to about 0.4 wt %, so that electrode peeling can be prevented more effectively.

Additionally, according to the cathode or the battery pursuant to an embodiment of the present invention, a part of maleic acid-denaturalized polyvinylidene fluoride is substituted with hexafluoro propylene and has a substitution ratio of about 5 wt % or less. Therefore, the cycle characteristics and the high load discharge capacity can be further improved.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode, comprising:
    a cathode mixture layer containing a cathode active material and a binder, the binder including maleic acid-denaturalized polyvinylidene fluoride
    wherein the content of the maleic acid-denaturalized polyvinylidene fluoride in the cathode mixture layer is in the range from 0.5 wt % to 4 wt %, and
    wherein an amount of polyvinylidene fluoride denaturalized maleic acid in the maleic-acid denaturalized polyvinylidene fluoride is in the range from 0.1 wt % to 0.4 wt %.

2. The cathode according to claim 1, wherein part of the maleic acid-denaturalized polyvinylidene fluoride is substituted with hexafluoro propylene, and its substitution ratio is less than about 5 wt %.

3. The cathode according to claim 1, wherein the cathode mixture layer contains a lithium phosphorous oxide having an olivine structure as the cathode active material.

4. A battery, comprising a cathode, an anode and an electrolyte, wherein:
    the cathode includes a cathode active material and maleic acid-denaturalized polyvinylidene fluoride as a binder;
    the content of the maleic acid-denaturalized polyvinylidene fluoride in the cathode mixture layer is in the range from 0.5 wt % to 4 wt %; and
    an amount of polyvinylidene fluoride denaturalized by maleic acid in the maleic-acid denaturalized polyvinylidene fluoride is in the range from 0.1 wt % to 0.4 wt %.

5. The battery according to claim 4, wherein part of the maleic acid-denaturalized polyvinylidene fluoride is substituted with hexafluoro propylene, and its substitution ratio is less than about 5 wt %.

6. The battery according to claim 4, where in the cathode mixture layer contains a lithium phosphorous oxide having an olivine structure as the cathode active material.

7. The battery according to claim 4, wherein a charge final voltage is 4.0 V or less.

8. The cathode according to claim 1, wherein the binder is composed of the maleic acid-denaturalized polyvinylidene fluoride.

9. The battery according to claim 4, wherein the binder is composed of the maleic acid-denaturalized polyvinylidene fluoride.

* * * * *